United States Patent [19]

Bittle

[11] 4,392,533
[45] Jul. 12, 1983

[54] ROOT CROP HARVESTER

[75] Inventor: Carl E. Bittle, Turlock, Calif.

[73] Assignee: Universal Foods Corporation, Milwaukee, Wis.

[21] Appl. No.: 270,810

[22] Filed: Jun. 5, 1981

[51] Int. Cl.³ .................... A01D 17/00; A01D 33/08; A01D 91/02
[52] U.S. Cl. ................................ 171/14; 56/10.2; 56/327 R
[58] Field of Search .............. 171/9, 14, 18; 209/653, 209/587; 56/10.2, 327 R

[56] References Cited

U.S. PATENT DOCUMENTS

| | | | |
|---|---|---|---|
| 3,473,613 | 10/1969 | Boyce | 171/14 |
| 3,581,888 | 6/1971 | Kelly et al. | 209/587 |
| 3,690,383 | 9/1972 | Malley et al. | 56/327 R |
| 3,942,590 | 3/1976 | Friedel, Jr. et al. | 171/18 |
| 3,980,181 | 9/1976 | Hoover et al. | 209/657 |
| 3,986,561 | 10/1976 | Bettencourt | 171/14 |
| 4,033,099 | 7/1977 | Friedel, Jr. | 171/18 |
| 4,060,133 | 11/1977 | Bettencourt | 171/1 |
| 4,082,189 | 4/1978 | Cordes | 209/587 |
| 4,088,227 | 5/1978 | Lockett | 209/657 |
| 4,147,017 | 4/1979 | Cortopassi | 171/14 |
| 4,168,005 | 9/1979 | Sandbank | 209/657 |
| 4,246,098 | 1/1981 | Conway et al. | 209/587 |
| 4,281,764 | 8/1981 | Fowler, Jr. | 209/657 |

Primary Examiner—Paul J. Hirsch
Attorney, Agent, or Firm—Neuman, Williams, Anderson & Olson

[57] ABSTRACT

A root crop harvester comprises means for picking up a mixture of roots, dirt and debris from the surface of a cultivated field and conveying the mixture upwardly and rearwardly along the harvester. The mixture is cleaned of small articles of dirt and debris by apertures along the conveyor means, ribbed rollers and the like. The partially cleaned mixture is passed to sorting conveyors which counterrotate to convey approximately one-half (½) of the mixture towards each side of the harvester. Sources of light are positioned to transmit light along the terminal ends of the sorting conveyors and a plurality of light sensors are positioned to receive light reflected from objects located at the terminal ends of the sorting conveyors. The reflected light is processed to generate root signals and dirt/debris signals. Rejecting fingers respond to the root signals to pass roots to a root crop conveyor and respond to dirt/debris signals to pass dirt and debris to a dirt and debris conveyor. The disclosed apparatus and method allow for mass flow sorting as well as either active or passive dirt and debris rejection.

11 Claims, 6 Drawing Figures

ROOT CROP HARVESTER

BACKGROUND OF THE INVENTION

This invention relates to apparatus for harvesting root crops and more particularly to such apparatus wherein a root crop of round or bulbous roots such as onions or garlic is reliably separated from a mixture of the root crop, dirt and debris which is picked up by the apparatus as it moves over a cultivated field in which the root crop is grown.

Root crop harvesters have been known in the prior art. Such prior art harvesters have incorporated various light sources and photoelectric cells to separate the root crop from the mixture of root crop, dirt and debris which is picked up by those harvesters. Illustrative of prior art root crop harvesters is the apparatus shown in U.S. Pat. No. 4,082,189 issued Apr. 4, 1978.

In this prior art harvester, a mixture of unearthed root crop and associated dirt and debris is lifted from the surface of a cultivated field and passed over a series of various conveying devices which serve to separate some of the dirt and debris from the mixture. The resulting mixture of root crop, dirt and debris is passed to an ultimate stage of conveyors which serve to "singularize" the root crop. Individual articles of the root crop and clump form dirt and debris are singularized into single file rows of articles which are supported in singularizing grooves formed between multiple rows of special narrow singulator belts mounted on the harvester. A plurality of incandescent lamps are focused through the singularizing grooves to strike articles of the mixture which are carried on the singulator belts. A plurality of photoelectric cells corresponding to the plurality of incandescent lights are positioned to receive light reflected from singularized articles of the mixture carried by the singulator belts and subjected to the focused incandescent light. The individual articles are identified and discriminated by the light which they reflect to the photoelectric cells. Articles identified as root crop product are passed to a root crop product conveyor while articles identified as dirt and debris are actively rejected in response to a signal from corresponding photoelectric cells to a dirt and debris rejection conveyor.

The active rejection of articles identified as dirt and debris is performed by air jets or mechanical fingers located within the singularizing grooves formed between the singulator belts. The air jets or mechanical fingers are controlled in response to signals generated by the photoelectric cells associated with the grooves formed by the singulator belts. The rejection air jets or fingers are located downstream from the photoelectric cells and are operated a defined period of time after the light reflected from singularized articles is sensed and the articles are identified as dirt and debris by the respective photoelectric cells. The operation of the rejection air jets or fingers is coordinated with the movement of the singulator belts. On operation, the air jets or fingers respectively blow or impact articles identified as dirt and debris to change the falling trajectory of the articles and divert them onto a dirt and debris conveyor which then conveys the articles to the side of the harvester where they are discharged back to the surface of the cultivated field. If the articles are identified by the photoelectric cells as root crop, the corresponding air jets or fingers are not activated and the articles so identified are allowed to fall onto the root crop conveyor.

The use of the singulator belts provided on the prior art harvester are a costly expedient and as the belts wear and must be replaced, the time required to replace multiple singulator belts is both lengthy and costly. Furthermore, the use of active rejection of dirt and debris for all root crops is undesirable. The use of active rejection for root crops harvested in a dry condition, such as onions, tends to disintegrate the rejected articles and allow small particles of dirt and debris to fall onto the root crop conveyor. This dirt and debris is passed with the roots to product cartons making the root crop product less desirable by virtue of its incomplete separation and such added dirt and debris adds to shipping weights.

SUMMARY OF THE INVENTION

Problems of the prior art are overcome by a root crop harvester for harvesting round, solid, orblike root crops such as onions or garlic which incorporates electronic sorting of articles randomly arranged on a single unitized belt conveyor, referred to herein as mass flow sorting. A passive dirt and debris rejection system can be provided to reduce equipment and maintenance costs for selected root crops while providing a higher quality of sorted root crop product.

In accordance with the present invention, a method and apparatus are provided for harvesting a root crop by separating the roots from a mixture including the roots, dirt and other debris. A mixture of roots, dirt and debris is picked up from the surface of a cultivated field and conveyed upwardly and rearwardly along the root crop harvester. A reticulated surface of the conveyor cleans the mixture by removing a portion of the dirt and debris therefrom. The mixture conveyor includes a terminal end for passing the mixture to either a root crop conveyor or a dirt and debris conveyor. A source of light is positioned to transmit light along the terminal end of the mixture conveyor. A plurality of light sensor means are positioned to receive light reflected from objects located at the terminal end of the mixture conveyor. The light sensor means are calibrated to generate root signals for light reflected from roots and dirt/debris signals for light reflected from dirt and debris thus discriminating between the two. A plurality of rejector fingers corresponding to the plurality of light sensor means are disposed between the mixture conveyor and the root crop, dirt and debris conveyors. The rejector fingers are controlled to pass objects to the root crop conveyor in response to root signals and to pass objects to the dirt and debris conveyor in response to dirt/debris signals received from the light sensor means. The rejector fingers may be positioned and controlled to provide either active or passive rejection of articles identified as dirt and debris.

For passive rejection, the rejector fingers are maintained in a fixed position to transfer or deflect articles of the mixture identified as roots at the terminal or discharge end of the mixture conveyor to the root crop conveyor and are rapidly moved aside to allow articles identified as dirt and debris to fall upon the dirt and debris conveyor. This manner of rejector finger operation is referred to as passive rejection since no disintegrating force, either pneumatic or mechanical, is applied to the dirt and debris to deflect it to an appropriate rejection conveyor. Thus, dirt clods and debris containing dirt and other foreign particles are not broken up or separated or allowed to pass to the root crop conveyor.

The root crop conveyor and the dirt and debris conveyor travel in the same direction to facilitate manual sorting in the event dirt or debris is inadvertently passed to the root crop conveyor or root crop is inadvertently passed to the dirt and debris conveyor. The dirt and debris conveyor is shortened relative to the root crop conveyor to prevent multiple manual sorting which can lead to culls being replaced onto the root crop conveyor after having previously been removed therefrom.

Advantageously, by positioning the light source and associated light sensor means along the edge of the terminal or discharge end of the mixture conveyor, singulator belts are no longer required and the root crop mixture can be sorted electronically during mass flow of the mixture. Furthermore, by providing for passive rejection of the dirt and debris from selected root crop mixtures, less dirt and debris is included in those final sorted root crop products.

BRIEF DESCRIPTION OF THE DRAWING

The invention of the present application will be better understood from a review of the detailed description of the invention with reference to the drawing in which.

It is to be understood that the drawing figures are not drawn to exact scale and that portions of the apparatus have been omitted from various drawing figures for clarity and ease of understanding.

DETAILED DESCRIPTION OF THE ILLUSTRATIVE EMBODIMENTS

Figure 1:
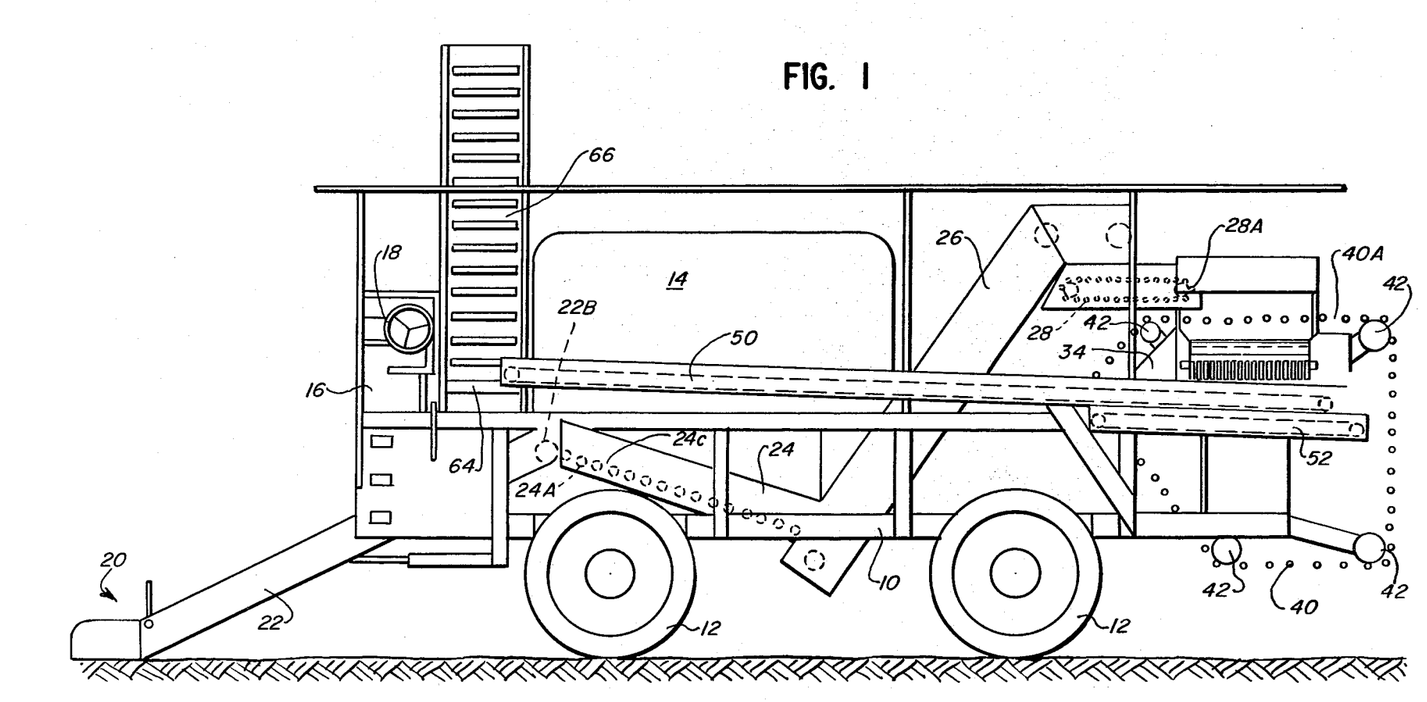
FIG. 1 is a side elevational view of a first embodiment of a root crop harvester in accordance with the present invention.

With reference to the drawing, FIG. 1 is a side view of a root crop harvester in accordance with the present invention. The harvester includes a frame 10 supported on driven wheels 12 for motion over a cultivated field. A power plant 14 is supported on the frame 10 and provides power for moving the harvester and for powering the equipment supported on the harvester. An operator's platform 16 includes controls (not shown) for controlling the operation of the harvester. In the embodiment shown in FIG. 1, the operator's steering wheel 18 is normal to the direction of travel of the harvester. However, the steering wheel could as well be mounted immediately in front of the operator in a more conventional manner (see the alternate embodiment illustrated in FIG. 5).

Figure 2:
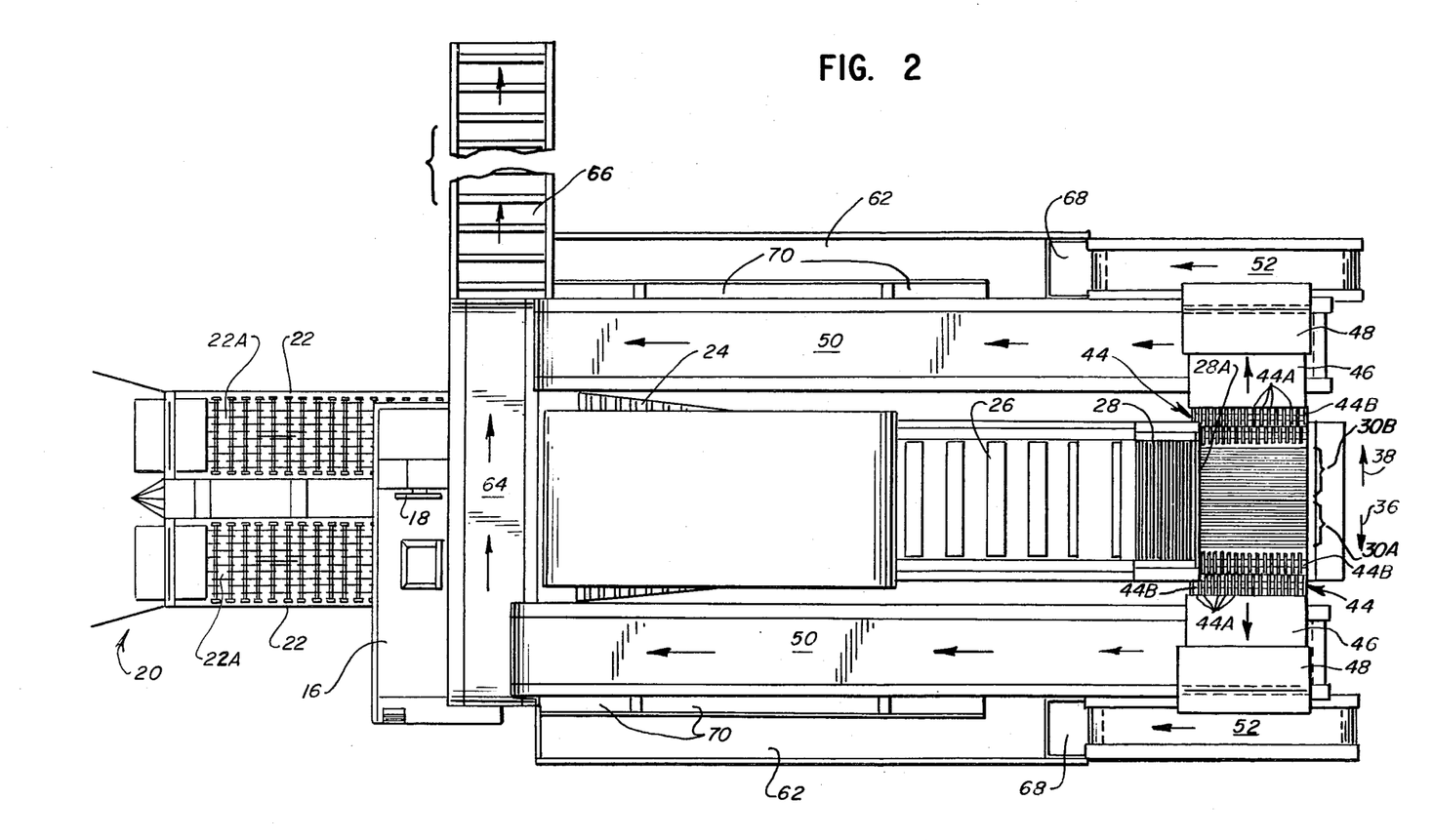
FIG. 2 is a top plan view of the harvester of FIG. 1.

At the forward end of the harvester is a pick up device 20 which passes or scoops a mixture of uprooted roots such as onions or garlic, dirt and debris from the surface of the cultivated field up and into a pair of reticulated chain conveyors 22 as best seen in FIG. 2. The chain conveyors 22 pass the mixture rearwardly and upwardly on the harvester, i.e., to the right as shown in FIGS. 1 and 2. Small particles of dirt and debris contained in the mixture fall to the field surface through the sized apertures 22A of the reticulated chain conveyors 22 as the mixture is moved rearwardly and upwardly on the harvester.

The mixture from the discharge end 22B of the two chain conveyors 22 is combined and passed to a ribbed roller assembly 24. The series of ribbed rollers 24A are rotated to pass the mixture toward the rear of the harvester and to tend to disintegrate dirt clods and other debris and to remove dirt or foreign particles from the roots. The rollers 24A of the roller assembly 24 are spaced apart by a distance 24C to allow smaller dirt clods and debris to fall to the field surface while transferring by their rotary motion, the roots and larger articles of dirt and debris rearwardly and discharging them to a flighted chain conveyor 26. The partially cleaned mixtue of roots with residual dirt and debris is elevated by the flighted chain conveyor 26 and passed to a belted link chain conveyor 28 which tends to distribute the mixture evenly across the width of the conveyor 28 as well as eliminating further articles of dirt and debris from the root crop, dirt and debris mixture.

As the mixture of roots, dirt and debris nears the end of the link chain conveyor 28 and is discharged by dropping onto a pair of ribbed roller assemblies 30, a forceful air stream generated by blower 34 is passed through the mixture. This air stream removes light particles of dirt and debris which are blown across the ribbed roller assemblies 30 out the back of the harvester and onto the surface of the cultivated field.

The pair of ribbed roller assemblies 30 are arranged with their roller axes parallel to the flow or discharge movement of conveyor 28. The two roller assemblies 30 respectively rotate toward the opposite sides of the harvester. The rollers of the lower ribbed roller assembly 30A as seen in FIG. 2 rotate toward the left side of the harvester as viewed by the operator seated in the driver's seat and indicated by the arrow 36 in FIG. 2. The rollers of the upper ribbed roller assembly 30B as seen in FIG. 2 rotate toward the right side of the harvester as indicated by the arrow 38 in FIG. 2. This counter-rotation of the rollers of the roller assemblies 30 divides the mass flow mixture and passes approximately one-half ($\frac{1}{2}$) of the mixture to each side of the harvester. The ribbed roller assemblies 30 also tend to distribute the mixture evenly across the width of the roller assemblies as well as further cleaning the mixture by removal of small particles of dirt and debris.

Large pieces of debris and large dirt clods or portions of agglomerated dirt are rejected by a belted link chain 40, for clarity shown only in FIG. 1, which is continuously circulated between the discharge end 28A of the link chain conveyor 28 and the ribbed roller assemblies 30. The large debris removal link chain 40 extends across the full width of the conveyor 28 and is supported on pairs of pulleys 42 located at the outer belted edges of the chain 40. At least one of the pulleys 42 serves to drive the chain 40 in a clockwise direction as viewed in FIG. 1. The links of the chain 40 are separated by spaces 40A of a sufficient width so that the root crop being harvested can pass between the links but large portions of debris and large dirt clods will remain supported on the links of the chain 40 and be rejected out the back of the harvester as the chain 40 rotates around the pulleys 42.

Roots and small articles of dirt and debris pass through the spaces 40A between the links of the link chain 40 and are then divided into two approximately equal portions by the counterrotation of the ribbed roller assemblies 30A and 30B. The two portions of the mixture are then passed to the disc roller assemblies 44 which are located outwardly from the ribbed roller assemblies 30. The disc roller assemblies 44 comprise circular discs 44A spaced approximately one inch (1") apart mounted coaxially on rotating rods 44B, with the axes of the rods and discs being normal to the direction of mass flow of the mixture on the roller assemblies 30. The disc roller assemblies 44 tend to further remove small dirt particles and spread the articles of the mixture of roots and remaining dirt and debris across the width of the disc roller assemblies 44.

The mixture of roots and remaining dirt and debris is passed from the roller assemblies 44 outwardly to electronic mass flow sorting conveyors 46. It is noted that the sorting conveyors 46 each utilize a single flat belt. The roots, dirt and debris are distributed on the conveyors 46 in a random mass flow pattern due to the actions of the various rollers and conveyors previously described. The randomly positioned articles of root crop, dirt and debris are not placed into single file order for sorting as in the prior art. The sorting of such randomly arranged articles is referred to herein as mass flow sorting.

The randomly oriented articles pass to electronic sorters 48 located at either side of the harvester and are selectively directed to either the root crop conveyors 50 or the dirt and debris conveyors 52 in accordance with signals generated by sorting apparatus contained within the electronic sorters 48. The preferred embodiment of the present invention utilizes infrared sorting techniques, however other sorting equipment can be employed in accordance with the present invention. Such electronic sorting systems are known in the prior art and the construction of the electronics and the associated circuitry form no part of the present invention and will not be described herein.

Figure 3:
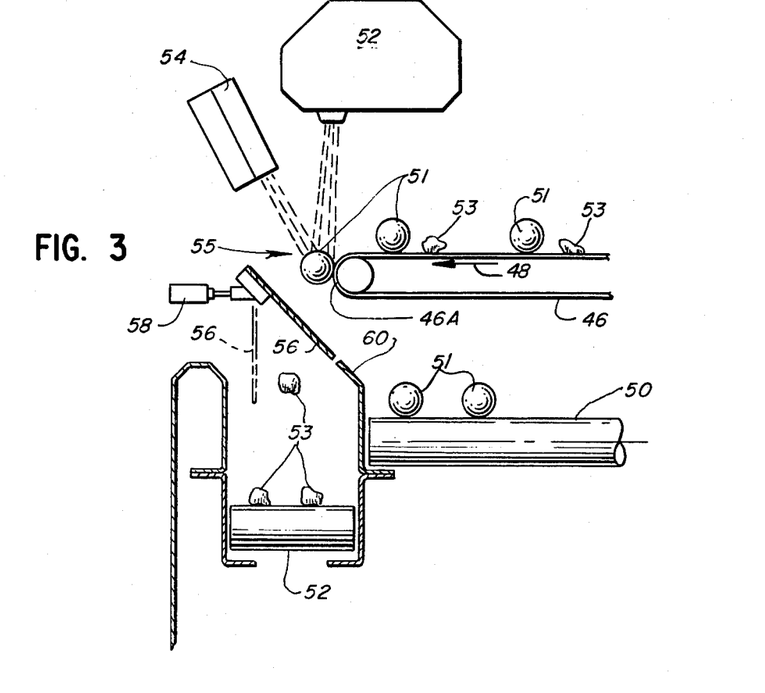
FIG. 3 is a fragmentary view from the rear of the harvester showing the orientation of electronic sorting apparatus to various conveyors on the harvester.
Figure 4:
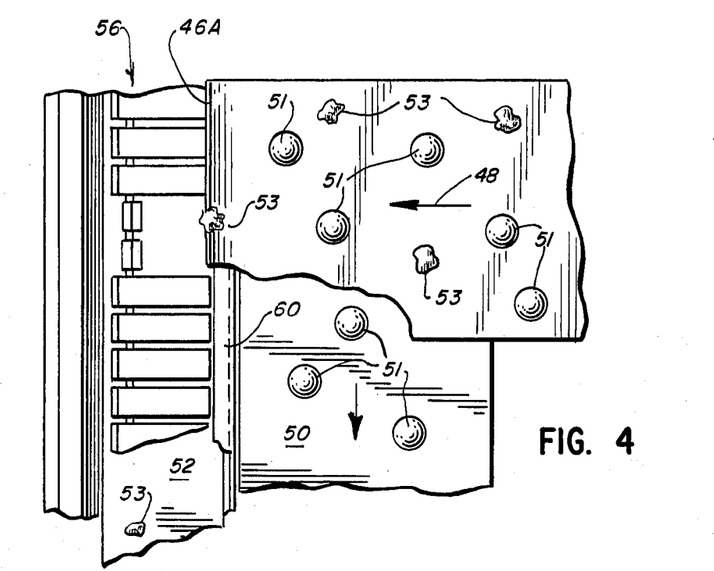
FIG. 4 is a plan view of the apparatus shown in FIG. 3 with the electronic sorting apparatus removed.

The performance of mass flow sorting in accordance with the present invention will now be described with reference to FIGS. 3 and 4. The randomly oriented or arranged roots 51, such as onions, and articles 53 of dirt and debris are shown on the mass flow sorting conveyor 46 in FIGS. 3 and 4. The conveyor 46 is moving to the left as shown in FIGS. 3 and 4 and indicated by arrows 48. As the objects in the mixture come to the terminal end 46A of the sorting conveyor 46, they are illuminated by a source of infrared light 52. The infrared light is directed along the edge of the conveyor 46 to prevent reflections of light therefrom. Infrared light reflected from articles of the mixture positioned at the terminal end 46A of the conveyor 46 as shown at 55, are received by a plurality of infrared light sensors 54 which correspond in number to a plurality of dirt/debris rejector fingers 56. The light sensors 54 are aimed slightly below the bottom edge of the terminal end 46A of the conveyor 46.

Each of the rejector fingers 56 is hingedly mounted for retraction away from the solid line position shown in FIG. 3 to the dotted line position shown in FIG. 3 under the control of a pneumatic, electrical or other actuating device 58 with one actuating device 58 being associated with each one of the spaced apart rejector fingers 56. The rejector fingers 56, when in the closed solid line position shown in FIG. 3, align with a flange 60 which, together with the closed rejector fingers 56, form or define a ramp angularly disposed to divert or deflect a root such as an onion dropped on top of the inclined angular surface defined by the ramp onto the root crop conveyor 50. On the other hand, if one or more rejector fingers are moved in response to a dirt/debris signal from the sensors 54 to the dashed line or open position shown in FIG. 3, an article of dirt or debris dropped from the terminal end 46A of the mass flow sorting conveyor 46 passes through the opening in the ramp provided by the opened rejector finger(s) and falls onto the dirt and debris conveyor 52.

The positioning and aiming of the infrared light source 52 and the infrared light sensors 54 at the terminal ends 46A of the sorting conveyors 46 allows the mass sorting operation to be performed on the randomly arranged mixture of bulbous roots, dirt and debris which are randomly arranged on the sorting conveyors 46. The positioning of the elements insures that light is not reflected from the belts of the sorting conveyors 46, the root crop conveyors 50 or the ramps formed by the rejector fingers 56 and the flanges 60. By sensing the objects in the mixture just prior to their ejection from the terminal end 46A of the sorting conveyors 46, the rejector fingers 56 can be operated or opened prior to the arrival of objects identified as dirt and debris in response to dirt/debris signals generated by one or more of the corresponding infrared light sensors 54. Thus, an identified article of dirt or debris is allowed to passively fall to the dirt and debris conveyor 52. The individual rejector fingers 56 are small and light in weight and can be rapidly operated by an actuating device 58 to move them between their closed solid line position and their open dashed line position shown in FIG. 3.

The passive dirt and debris rejection system described above is very advantageous for root crops which are uprooted and harvested dry, such as onions. However, such passive rejection is slower than active rejection systems where for example, dirt and debris are rejected by being struck by rejector fingers as they are operated. Such active rejector systems are desirable for crops which are irrigated prior to harvest, such as garlic. Such preirrigated crops tend to have much smaller articles of dirt and debris mixed with them at harvest and hence require more rapid operation of the dirt and debris rejection system. Thus, a harvester in accordance with the present invention and providing mass flow sorting is modified not only to provide for active rejection but also to reduce the size of apertures provided in the conveyor systems to accommodate the harvesting of such preirrigated root crops.

The refitting of the harvester for active dirt and debris rejection would generally require the transposition of the root crop conveyor and the dirt and debris conveyor together with the reverse operation of the rejector fingers 56. That is, the rejector fingers 56 would be normally held in the dashed line position shown in FIG. 3 and operated to the solid line position to strike and divert articles to a dirt and debris conveyor. Of course, as previously mentioned, the positions of the two conveyors 50 and 52 would be reversed.

Although the electronic sorting in accordance with the present invention is highly reliable, resulting in little debris being passed to the root crop conveyor and little root crop being passed to the dirt and debris conveyor, it is possible that errors will occur. Accordingly, the root crop conveyors 50 and the dirt and debris conveyors 52 are positioned parallel to one another and convey their respective materials in the same direction, i.e., toward the front of the harvester. Manual sorting platforms 62 (not shown in FIG. 1) are provided for workers to stand and manually inspect and sort the root crop which is passed by the root crop conveyors 50 to a cross-conveyor 64 and ultimately to a delivery elevator 66.

A person positioned toward the rear of each manual sorting platform 62 reviews the articles conveyed on the dirt and debris conveyor 52 and any root crop found to be mixed in with the dirt and debris is manually transferred to the root crop conveyors 50. The remaining articles carried by the dirt and debris conveyors 52 are allowed to fall onto the field surface through the rejection chutes 68 shown only in FIG. 2 for clarity. One or more additional persons can be stationed forwardly along each of the manual sorting platforms 62 to review the root crop product carried on the root crop conveyors 50 and remove any culls from the root crop product carried thereon and any dirt or debris which was inadvertently passed to the root crop conveyor 50 by the electronic sorting systems 48.

The manually sorted culls, dirt and debris are passed to the surface of the field through a pair of cull chutes 70 shown only in FIG. 2 positioned next to the root crop conveyors 50. It is noted that the dirt and debris conveyors 52 are shorter than the root crop conveyors 50 to prevent multiple manual sorting of the harvested root crop. If manual sorting is performed between the root crop conveyor 50 and the dirt and debris conveyor 52 along the entire length of the root crop conveyor 50, a cull, in one sorter's opinion, may be removed from the root crop conveyor 50 and passed to the dirt and debris conveyor 52. Another sorter further down the root crop conveyor 50 could believe that the cull was inadvertently rejected by the electronic sorters 48 and place the cull back onto the root crop conveyor 50. It is noted that by having the same direction of conveyance for the root crop conveyors 50 and the dirt and debris conveyors 52, the manual sorting procedure of articles on the dirt and debris conveyors 52 is simplified.

Figure 5:
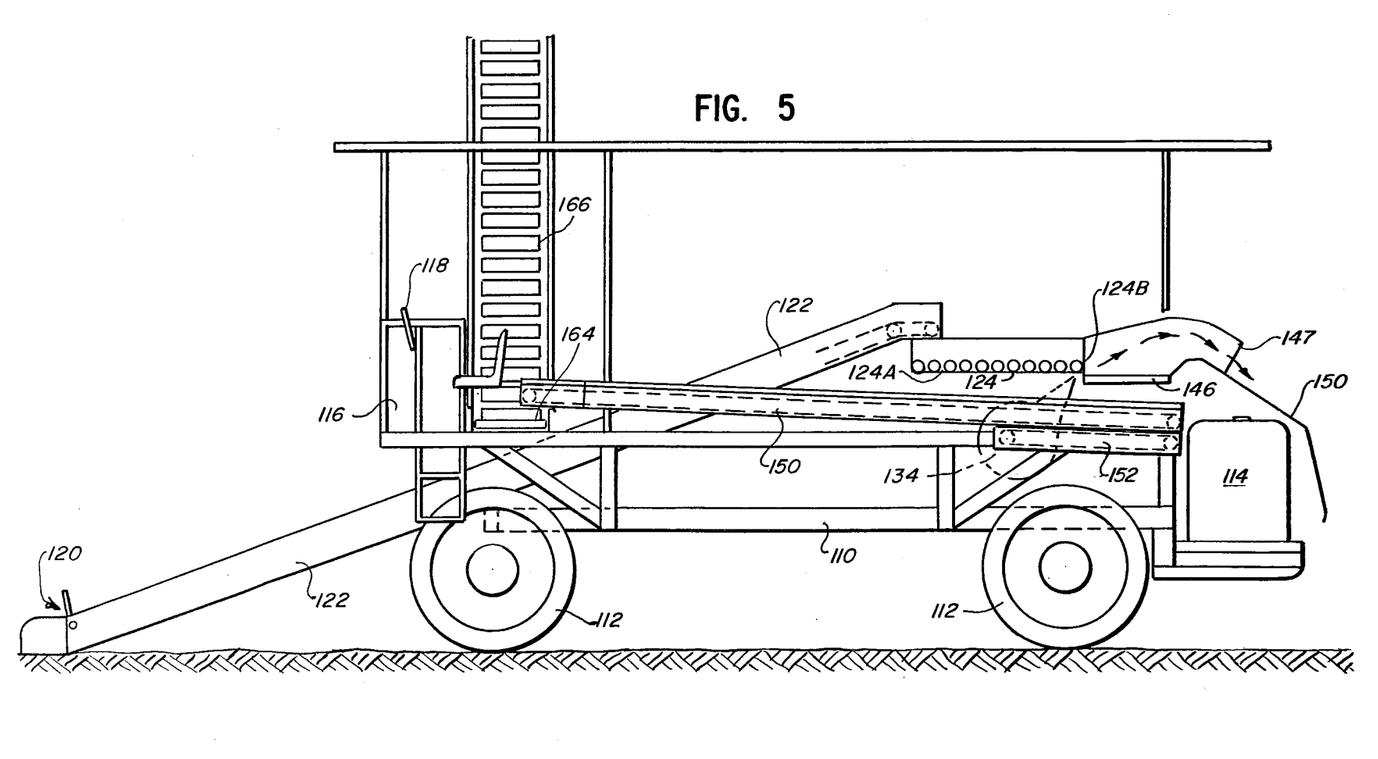
FIG. 5 is a side elevational view of an alternate embodiment of a harvester in accordance with the present invention.
Figure 6:
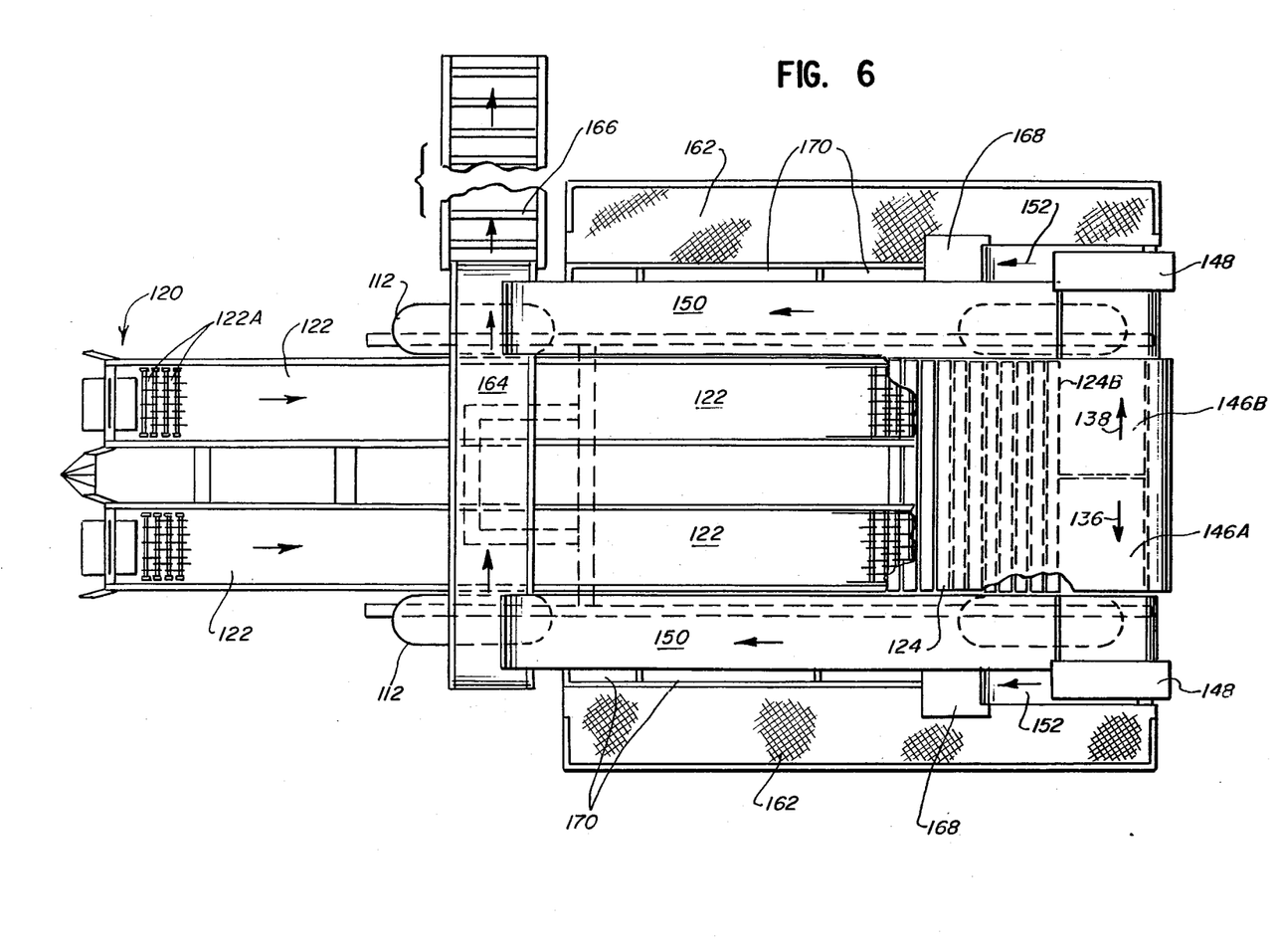
FIG. 6 is a plan view of the harvester of FIG. 5.

With reference to FIGS. 5 and 6, a side elevational and top plan view respectively of an alternate embodiment of a root crop harvester in accordance with the present invention are shown. The harvester includes a frame 110 supported on wheels 112 for motion over a cultivated field. A power plant 114 is positioned to the rear of the harvester and connected to the frame 110. The power plant 114 provides power for moving the harvester as well as powering the equipment supported on the harvester. An operator's platform 116 includes a steering wheel 118 and other controls (not shown) for controlling the operation of the harvester.

At the forward end of the harvester is a pick up 120 which passes or scoops a mixture of roots, dirt and debris from the surface of a cultivated field up and into a pair of reticulated chain conveyors 122 as best seen in FIG. 6. The chain conveyors 122 pass the mixture rearwardly and upwardly on the harvester, i.e., to the right as shown in FIGS. 5 and 6. Small particles of dirt and debris contained in the mixture fall to the field surface through apertures 122A of the reticulated chain conveyors 122 as the mixture is moved rearwardly and upwardly of the harvester.

The mixture from the two chain conveyors 122 is combined and passed to a ribbed roller assembly 124. The series of ribbed rollers are rotated to pass the mixture toward the rear of the harvester and to tend to disintegrate dirt clods and other debris and to remove dirt or foreign particles from the roots. The rollers of the roller assembly 124 are separated by spaces 124A to allow small dirt clods and debris to fall to the field surface while transferring the roots and larger articles of dirt and debris toward the rear of the harvester.

As the mixture of roots, dirt and debris nears the end 124B of the ribbed roller assembly 124 and is dropped onto a pair of mass flow sorter conveyors 146, a forceful air stream generated by a blower 134 is passed through the mixture. This air stream removes light particles of dirt and debris which are blown across the sorting conveyors 146 through a shrouding 147 and over a shield 150 and onto the surface of the cultivated field.

The lower sorting conveyor 146A as seen in FIG. 6 conveys toward the left side of the harvester as viewed by the operator seated in the driver's seat and indicated by the arrow 136 in FIG. 6. The upper sorting conveyor 146B as seen in FIG. 6 rotates toward the right side of the harvester as indicated by the arrow 138 in FIG. 6. This counterrotation of the sorting conveyors 146A and 146B divides the mixture and passes approximately one-half ($\frac{1}{2}$) of the mixture to each side of the harvester. The mixture tends to be evenly spread across the width of the sorting conveyors 146 as it is dropped from the ribbed roller assembly 124 and acted upon by the air stream from the fan 134.

The mixture of roots and remaining dirt and debris is passed to electronic sorters 148 located at either side of the harvester and articles of the mixture are selectively directed to either the root crop conveyors 150 or the dirt and debris conveyors 152 in accordance with signals generated by sorting apparatus contained within the electronic sorters 148.

The performance of mass flow sorting in the embodiment of the present invention shown in FIGS. 5 and 6 is the same as that previously described for the embodiment shown in FIGS. 1 and 2 and described with reference to FIGS. 3 and 4 above. Also, passive or active dirt and debris rejection can be selectively incorporated dependent on the root crop to be harvested.

Here again manual sorting platforms 162 are provided and the manual sorting is performed as previously described herein. Dirt and debris fall onto the field surface from the dirt and debris conveyor 152 through rejection chutes 168 and manually sorted dirt, debris and culls are passed to the field surface through cull chutes 170. The root crop is similarly passed to a cross-conveyor 164 from the root crop conveyors 150 and from the cross-conveyor 164 to a delivery elevator 166.

From the above description, it is apparent that an improved root crop harvester has been described wherein a mixture of roots, dirt and debris are conveyed and initially separated to eliminate portions of the dirt and debris and ultimately passed to electronic sorting equipment which separates the roots from the remaining dirt and debris during mass flow of randomly arranged articles of the mixture on unitized conveyor belts with the roots being passed to root crop conveyors and dirt and debris being rejected to dirt and debris conveyors whereby the ultimate sorted root crop is cleaner and requires less manual sorting than in the prior art. While only two illustrative embodiments have been set forth, other alternative embodiments and various modifications will be apparent from the above description to those skilled in the art. For example, various conveying arrangements and the location of the electronic sorting apparatus on the harvester can be readily changed. Also, if the mass flow sorting is performed at an alternate location in the conveying system, the mass flow sorting could be performed at a single location rather than the two locations of the illustrative embodiments. Simlarly, various conveyor arrangements could be provided whereby the dirt and debris conveyor and the root product conveyor travel toward the rear of the harvester or across the harvester rather than as shown in the illustrative embodiments. Furthermore, the dirt/debris rejecting fingers could be operated to impact the roots and thereby actively divert them to the root crop conveyor; and remain inoperated to allow articles of dirt and debris to fall to the dirt and debris conveyor. Such alternate embodiments and modifications are considered to be within the true spirit and scope of the present invention as claimed by the appended claims.

What is claimed is:

1. An apparatus for mechanically harvesting from a field a tuberous root crop subsequent to the latter having been uprooted, said apparatus comprising a frame movable in a forward direction across the field and having a front end provided with means for simultaneously collecting a mixture of roots, dirt clods and other debris as the frame moves in a forward direction; a first conveyor means mounted on said frame for receiving in a random arrangement the collected mixture and moving same rearwardly and upwardly from the frame front end and simultaneously therewith causing portions of the conveyed mixture other than roots to be initially separated from the remainder of the mixture and returned to the field; a second conveyor means mounted on said frame and adjacent the rear end of said first conveyor means for receiving in a random arrangement the remaining mixture discharged from the first conveyor means, said second conveyor means moving the discharged remaining mixture away from the rear end of the first conveyor means and simultaneously therewith causing additional portions of the conveyed remaining mixture other than roots to be separated therefrom and returned to the field; a third conveyor means mounted on said frame and having a receiving station spaced beneath the discharge end of said second conveyor means; a fourth conveyor means mounted on said frame and having a receiving station spaced beneath the discharge end of said second conveyor means, said third and fourth conveyor means being in substantially parallel relation and conveying in substantially the same direction; light emitting means mounted on said frame adjacent the discharge end of said second conveyor means for directing a plurality of light beams on the remaining mixture as it is being discharged from the second conveyor means; sensor means mounted on said frame adjacent the discharge end of said second conveyor means for sensing the light reflected from the discharged remaining mixture and generating signals therefrom, said generated signals being compared to a defined threshold signal level representing a root; signal responsive deflector means mounted on said frame and disposed between the discharge end of said second conveyor means and the receiving stations of said third and fourth conveyor means, said deflector means in response to predetermined signals from said sensor means passively causing detected roots to be directed in a random arrangement onto the third conveyor means receiving station while the remainder of the mixture is caused to be directed in a random arrangement onto the fourth conveyor means receiving station; a manual sorting station mounted on said frame adjacent said third and fourth conveyor means whereby undetected roots on said fourth conveyor means are manually transferred to said third conveyor means; and a root collection station mounted on said frame adjacent the discharge end of said third conveyor means.

2. The apparatus of claim 1 wherein the deflector means includes a plurality of independently operable fingers arranged in side-by-side relation and forming a row which is substantially coextensive with the width of the discharge end of said second conveyor means, the number of light beams emitted corresponding to the number of fingers in the row, each finger being responsive to a signal generated by the light reflected from the corresponding beam by a detected root whereby upon receiving the root signal the detected root in registration with the said finger is caused to be directed to the receiving station of said third conveyor means.

3. The apparatus of claim 2 wherein at least one light reflective sensor means is provided for each two-inch segment of the width of the discharge end of said second conveyor means.

4. The apparatus of claim 2 wherein said fingers are operated to perform passive rejection so that said fingers are moved aside to provide at least one opening to allow non-root articles to fall to said fourth conveyor means through said opening and maintained in a fixed position to divert detected roots to said third conveyor means.

5. The apparatus of claim 2 wherein said fingers are operated to perform active rejection so that said fingers are moved to strike and deflect non-root articles onto said fourth conveyor means and maintained in a fixed position to allow detected roots to fall to said root crop conveyor means.

6. The apparatus of claim 1 wherein said light emitting means generates light beams in the infrared spectrum.

7. The apparatus of claim 1 wherein said fourth conveyor means is shorter than said third conveyor means to prevent multiple and thereby self-cancelling manual sorting operations.

8. A method of mechanically harvesting from a field a tuberous root crop subsequent to the latter having been uprooted, said method comprising
(a) collecting from the field a mixture of roots, dirt clods and other debris,
(b) depositing in a random arrangement on a first conveyor means the collected mixture and moving same thereby in an upward and rearward direction while portions of said mixture other than roots are initially separated from the remainder of the mixture and returned to the field,
(c) depositing in a random arrangement the remaining mixture on a second conveyor means and moving same thereby in a second direction while additional portions of the conveyed mixture other than roots are simultaneously separated from the remaining mixture,
(d) inspecting the remaining mixture at the discharge end of the second conveyor means with light sensing means to detect the presence of roots in the remaining mixture discharged from the second conveyor means, the detected roots generating root signals,
(e) sorting the inspected remaining mixture responsive to said root signals at the discharge end of said second conveyor means for passively segregating the detected roots from the remainder of the discharged mixture and depositing in a random arrangement said roots on a third conveyor means and the remaining discharged mixture on a fourth conveyor means, (f) said detected roots and the remaining discharged mixture being conveyed in substantially the same direction by the respective third and fourth conveyor means past a manual sorting station whereby undetected roots on said fourth conveyor means are manually transferred to said third conveyor means and undesirable dirt and debris deposited on said third conveyor means are manually removed therefrom and returned to the field, (g) said roots on said third conveyor means subsequent to passing said sorting station being conveyed to a collection station.

9. The method of claim 4 wherein the second conveyor means separates the deposited remaining mixture into two sections, each section being conveyed in a different direction; each conveyed section of the depositing remaining mixture being inspected by a light sensing means to detect the presence of roots in each section, each detected root generating a root signal, and sorting means for each conveyed section responsive to said root signals for segregating the detected roots from the remainder of the inspected section of the mixture.

10. The method of claim 8 wherein the inspecting of the remaining mixture includes directing a beam of light along the mixture as the latter is being discharged from the end of the second conveyor means; sensing the light reflected from the discharged mixture and generating signals therefrom; and comparing the generated signals to a defined threshold signal level representative of a root.

11. The method of claim 8 wherein the sorting of the inspected remaining mixture includes the latter being engaged by a plurality of indepdendently operable fingers, each being responsive to a generated signal whereby a detected root will be directed thereby onto the third conveyor means and the remaining mixture will be directed thereby onto the fourth conveyor means.

* * * * *

UNITED STATES PATENT AND TRADEMARK OFFICE
CERTIFICATE OF CORRECTION

PATENT NO. : 4,392,533
DATED : July 12, 1983
INVENTOR(S) : Carl E. Bittle

It is certified that error appears in the above-identified patent and that said Letters Patent are hereby corrected as shown below:

Column 4, line 17, "mixtue" should be "mixture".

Column 11, claim 9, line 1, "claim 4" should be "claim 8".

Column 11, claim 9, lines 4 and 5, "depositing" should be "deposited".

Column 12, claim 11, line 3, "indepdendently" should be "independently".

Signed and Sealed this

Third Day of April 1984

[SEAL]

Attest:

Attesting Officer

GERALD J. MOSSINGHOFF

Commissioner of Patents and Trademarks